(12) United States Patent
Lorenz

(10) Patent No.: US 7,263,674 B2
(45) Date of Patent: Aug. 28, 2007

(54) SYSTEM AND METHOD FOR THREE-DIMENSIONAL VISUALIZATION AND POSTPROCESSING OF A SYSTEM MODEL

(75) Inventor: Gunar Lorenz, St. Remy les Chevreuse (FR)

(73) Assignee: Coventor, Inc., Cary, NC (US)

( * ) Notice: Subject to any disclaimer, the term of this patent is extended or adjusted under 35 U.S.C. 154(b) by 212 days.

(21) Appl. No.: 10/731,260

(22) Filed: Dec. 5, 2003

(65) Prior Publication Data

US 2005/0125750 A1    Jun. 9, 2005

(51) Int. Cl.
G06F 17/10    (2006.01)
G06F 17/50    (2006.01)
G06G 7/48    (2006.01)

(52) U.S. Cl. .............................. 716/4; 716/11; 716/12; 703/2; 703/6

(58) Field of Classification Search .................. 716/3–4, 716/11–12, 18; 703/2, 4, 6
See application file for complete search history.

(56) References Cited

OTHER PUBLICATIONS

"An Environment for Design and Modeling of Electro-Mechanical Micro-Systems" (Journal of Modeling and Simulation of Microsystems, vol. 1, No. 1, pp. 65-76, 1999) M.H. Zaman†, S.F. Bart, and J.R. Gilbert; Microcosm Technologies, Inc., Cambridge, MA 02142; N.R. Swart, and M. Mariappan,Analog Devices, Inc., Cambridge, MA 02139.*

"Model Library and Toll Support for MEMS simulation" by Peter Schwarz and Peter Schneider, Conference on "Microelectronic and MEMS Technology", Edinburgh, Scotland, SPIE Proceedings Series vol. 4407, pp. 1-14, 2001.*

* cited by examiner

Primary Examiner—Paul Dinh
(74) Attorney, Agent, or Firm—Lahive & Cockfield, LLP

(57) ABSTRACT

The generation of a graphical three-dimensional (3D) view of a system model of a Micro Electro-Mechanical System (MEMS), which also may be depicted in a schematic view, is disclosed. Information contained in the system model is used to generate 3D representations of model components which are then assembled into an overall model. The system model is composed by selecting MEMS component models from a MEMS component library. The MEMS component models include parameter information and include or reference 3D view generators used to generate the 3D view of the associated component. The system model is programmatically analyzed to identify the associated 3D view generators used to generate the 3D views of the components. The visualization process may be extended to include a simulator which simulates the underlying system model. The simulation results are then displayed by using the 3D visualization process to present 3D views of the model as it changes during different points in the simulation.

55 Claims, 7 Drawing Sheets

SYSTEM AND METHOD FOR THREE-DIMENSIONAL VISUALIZATION AND POSTPROCESSING OF A SYSTEM MODEL

FIELD OF THE INVENTION

The illustrative embodiment of the present invention relates generally to system modeling and more particularly to the three-dimensional (3D) visualization and post-processing of a system model of a MEMS device.

BACKGROUND

Computer Aided Design (CAD) systems are used to design and simulate virtual models of electrical, electronic or mechanical devices prior to producing actual physical devices. CAD systems are interactive software tools that run on a digital computer with a graphical display device. In particular, micro-fabricated devices such as electronic integrated circuits (ICs) and Micro Electro-Mechanical Systems (MEMS) can be designed and simulated virtually using CAD systems prior to beginning the costly and time-consuming process of fabricating the actual physical devices.

MEMS are micro- or nano-scale devices typically fabricated in a similar fashion as integrated circuits (ICs) to exploit the miniaturization, integration, and batch processing attainable with semiconductor manufacturing processes. Unlike ICs which consist solely of electrical components, MEMS devices combine components from multiple physical domains and may contain, for example, electrical, mechanical, and fluidic components. MEMS devices appear in many forms and may include micro-electromechanical sensors and actuators such as gyroscopes, accelerometers, and pressure sensors, micro-fluidic devices such as ink jet heads, Radio-Frequency (RF) devices such as switches, resonators, varactors, and passives, and optical devices such as micro-mirrors and fiber alignment devices.

The behavior of both MEMS and IC devices can be modeled at the system level as an interconnected network of simpler components. Each component has an underlying mathematical description, or behavioral model, which is referred to herein as a component model. Typically, these component models are parameterized, i.e. they take as input a few parameters such as width and height, so that the same mathematical model can be used for different versions of the same type of component. For example, a single component model may be used to generate particular models having different dimensions. A system simulator numerically computes, or simulates, the collective behavior of the network of component models.

Two commonly used methods of implementing a system simulation are circuit simulation (also referred to as conservative system simulation) and signal-flow simulation. A system model is captured graphically in a circuit schematic or in a signal-flow diagram, and then its behavior is simulated by, respectively, a circuit simulator or a signal-flow simulator. Traditionally, circuit simulation has been used for electronic circuit design while signal-flow simulation has been used for control system and signal processing design. Currently, both types of system simulation are used to simulate not only ICs, but also multi-physics devices such as MEMS.

Since MEMS devices can also be simulated by system modeling methods such as circuit simulation, CAD systems for IC design can be applied to MEMS design, at least in principle. In particular, IC schematic editors and circuit simulators may be applied to MEMS design when supplied with a library of MEMS component models such as mechanical beams, plates, electrodes, magnetic coils, optical lenses and lasers. Unfortunately, there are a number of drawbacks to the application of CAD systems originally intended for IC design to the MEMS design process. Schematics representing MEMS are usually rather abstract representations of 3D objects in space. The geometry, position and orientation of each modeled substructure is defined by the parameters of the corresponding schematic symbol. Minor parameter changes can result in substantially different device geometry and/or optical system setups. While conventional IC design tools allow the user to extract a two-dimensional layout from a schematic, they do not include the 3D visualization capability needed to understand and verify the parameter settings and symbol connectivity of non-electrical structures like MEMS.

Additionally, conventional methods of visualizing schematic designs of a model make it difficult to interpret network simulation results. Unlike conventional IC system modeling environments, working efficiently with MEMS models requires a 3D graphical environment for visualizing the shape, orientation and position of the modeled structures. In conventional IC schematics, electrical "wires" connect the schematic symbols. The results of circuit simulations, such as voltage and current changes over time or frequency on individual wires, can be displayed graphically in 2D "X-Y plots". Two-dimensional X-Y plots are generally sufficient for understanding purely electrical circuits. MEMS simulations, however, involve spatial displacements and/or rotations of the mechanical substructures or other physical entities such as beams of light. The symbols that represent the MEMS components or substructures are linked by mechanical "wires" that are associated with mechanical degrees of freedom, such as spatial displacements, rotations, forces, or torques. The wires in a MEMS schematic may also be optical "wires" that represent properties of light beams, such as the light intensity within a frequency band. Similar to simulations of electrical circuits, these non-electrical quantities from MEMS simulations can be displayed in X-Y plots. For example, the displacement of a beam component along the x-axis versus voltage change at an electrode can be shown in an X-Y plot. These X-Y plots are not sufficient, however, for understanding the motion of a complex MEMS that may consist of tens or hundreds of individual mechanical components and/or multiple optical beams.

BRIEF SUMMARY OF THE INVENTION

The illustrative embodiment of the present invention provides a 3D visualization of a MEMS model that is programmatically integrated with a schematic view in a CAD environment. The MEMS model is composed of model components that have been selected from a MEMS component library. Each model component in the MEMS component library includes a mathematical behavioral model, a graphical symbol that can be displayed by the schematic editor, and a "3D view generator", a computer script or program that contains the information needed to draw a 3D graphical view of the component. The user creates a system model of a MEMS device in the schematic editor by selecting components from the MEMS component library, placing them in the schematic view, specifying values of their parameters, and "wiring" them together. A schematic visualizer composes the 3D view by obtaining a list of components and their parameter values from the system model and then calling the 3D view generator associated with each component. Changes in the geometric model parameters in the system model may result in a programmatic update of the 3D view of the model. Similarly, changes in the parameters of a selected part in the 3D view may result in a programmatic update of the schematic view. The 3D view and the schematic view of the model also may be connected such that selection of a part in the 3D view or the schematic view results in the highlighting of the corresponding part in the other view. Errors in a system model may be highlighted in the 3D view as a method of error checking. Circuit simulation results also may be visualized using the 3D view generators by programmatically providing continuous updates of the individual 3D views to the overall 3D view of the model, resulting in an animation of the mechanical motion of the mechanical device.

In one embodiment, in conjunction with a system modeling environment, a method provides a micro-electrical mechanical system (MEMS) model having multiple components. The schematic view of the MEMS model is displayed to a user. Also displayed to a user is a graphical 3D view of the schematic design. The schematic and the 3D views are cross-referenced so that changes in either the 3D view or the schematic view are reflected in the other view.

In another embodiment, in conjunction with a system modeling environment, a method provides simulation results from the simulation of a multi-component MEMS system model. The method also provides a graphical 3D view of the schematic design of the model. Results from the simulation are displayed in the 3D view with the 3D view being progressively altered to reflect the simulation results at different points in the simulation.

In an embodiment, in conjunction with a system modeling environment, a system includes a MEMS component library holding multiple MEMS model components. The MEMS model components include a mathematical behavioral model, a graphical symbol for display in a schematic editor, and a 3D view generator or a reference to a 3D view generator. The 3D view generator is computer code containing information necessary for the 3D display of the model component. The system also includes a schematic editor for creating a MEMS schematic and a schematic visualizer. The schematic visualizer uses the 3D view generators to construct a 3D view of the MEMS model.

DETAILED DESCRIPTION

The illustrative embodiment of the present invention enables the generation of a graphical three-dimensional (3D) view of a Micro Electro-Mechanical System (MEMS) model captured in a schematic. Information contained in the MEMS model is used to generate 3D views of model components that collectively compose an overall 3D view. The MEMS schematic holds mathematical representations of MEMS model components selected from a MEMS model library. The MEMS model components include parameter information and include or reference 3D view generators used to generate the 3D view of the associated part. The MEMS model is programmatically analyzed to identify the associated 3D view generators used to generate the 3D views of the components. Connection information from the MEMS model is leveraged to connect the individual 3D views of the components. The visualization process may be extended so to include a simulator that simulates the underlying MEMS model. The simulation results are then displayed by using the 3D visualization process to present a 3D view of the MEMS device that progressively changes to reflect the simulation results over time, frequency or any other physical quantity being varied during the simulation.

A schematic of a MEMS device is composed in a schematic editor by selecting, placing and connecting symbols that represent component models. Procedurally, the user selects the desired component models from the available component model libraries, configures the parameters of the component models, and interconnects their ports to create a schematic of the entire device. The procedure is analogous to integrated circuit capture, where symbols representing electronic components such as transistors, resistors, inductors and capacitors are connected to create the desired circuit behavior. The symbols that represent the electronic components have ports, or pins, that can be connected by wires to pins on other components. Each pin has a voltage and transfers current into or out of the component. In MEMS schematic capture, the components may represent entities from other physical domains, such as masses, plates, magnets, lasers, optical lenses, electrostatic comb structures and electrodes. The symbol ports of MEMS component models represent inputs for electrical, mechanical, magnetic, fluidic, or optical sources, or can be input or output control pins for mechanical degrees of freedom (translational and rotational motions). MEMS component libraries include underlying behavioral models that describe mathematically how the individual components behave when subjected to electrical or mechanical stimuli, or stimuli from other domains. A component itself may also be a subsystem comprised of other components, such as a mirror, which might be composed of a plate, beams and electrodes.

Figure 1:
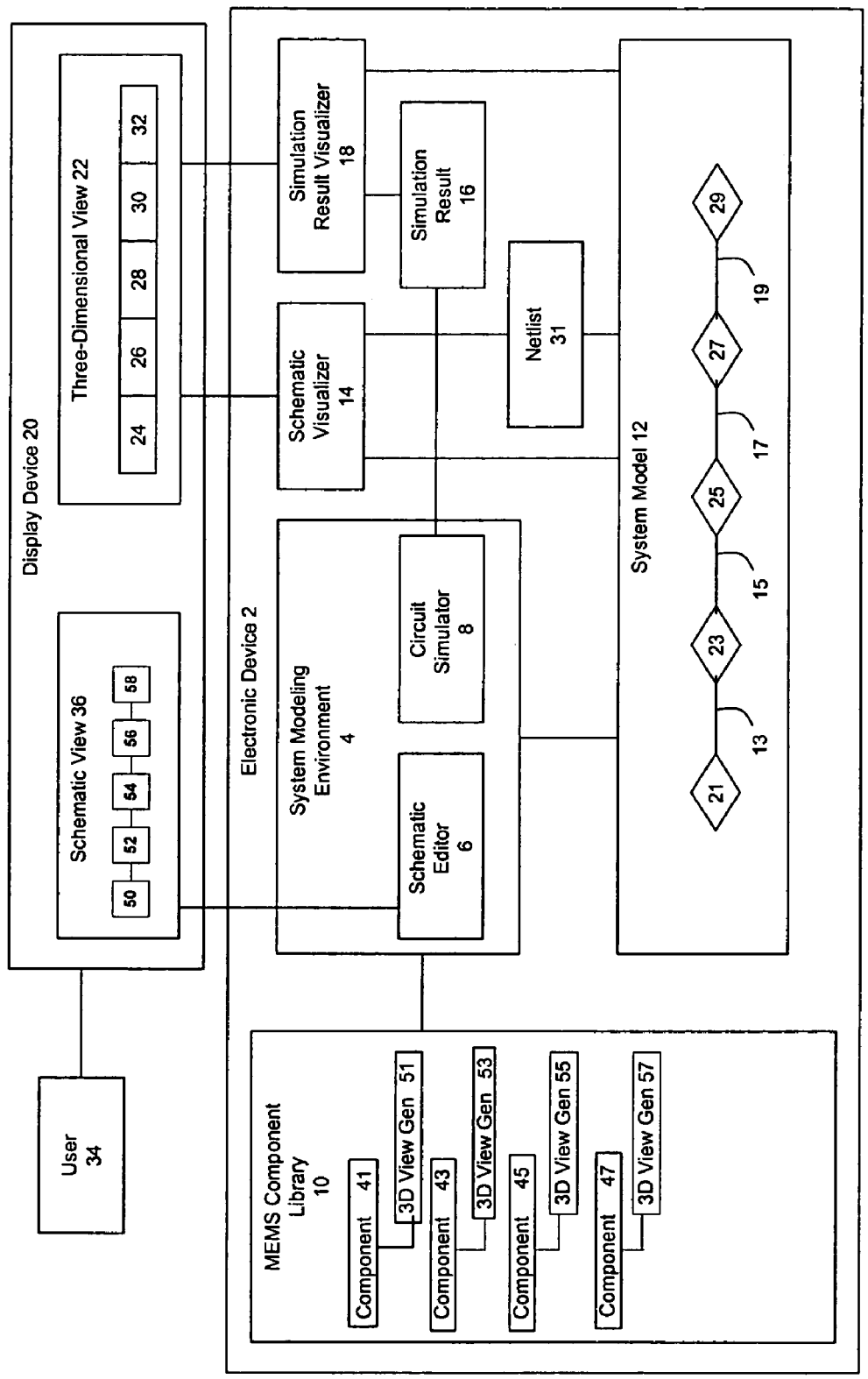
FIG. 1 depicts a CAD environment suitable for practicing the illustrative embodiment of the present invention.

FIG. 1 depicts an environment suitable for practicing the illustrative embodiment of the present invention. An electronic device 2 holds a system modeling environment 4. The electronic device 2 may be a server, workstation, laptop, or some other type of electronic device equipped with a processor and capable of supporting the system modeling environment 4. The system modeling environment 4 includes a schematic editor 6 and a circuit simulator 8. The schematic editor 6 is used to create and/or edit a system model 12. A user 34 selects abstract graphical symbols representing MEMS model components 41, 43, 45, and 47 from the MEMS component library 10 and places them in a schematic view 36 where representations of the model components 50, 52, 54, 56 and 58 are displayed in two dimensions to the user 34. The user also specifies or draws connections between the symbols in the schematic view. The schematic editor 6 maintains an underlying system model 12 that corresponds to the schematic view. The system model 12 contains references to particular instances 21, 23, 25, 27 and 29 of the MEMS model components 41, 43, 45 and 47. More than one instance may reference the same model component. The system model also contains connections 13, 15, 17 and 19 between the component instances. Furthermore, the schematic editor is used to specify the values of the parameters that define each component instance. The parameters for each component are part of the component definition 41, 43, 45 and 47. In the case of MEMS components, the component parameters may include geometrical dimensions such as position, orientation, length, width and height, layer names or material properties like density and modulus of elasticity.

The schematic visualizer 14 is used to create a 3D view 22 of the system model 12, which is displayed on a display device 20 to a user 34. A netlist 31 may be programmatically derived from the system model 12 and contains equivalent information. The 3D view 22 is a composite of individual 3D views 24, 26, 28, 30 and 32 of the MEMS model components 21, 23, 25, 27 and 29 referenced by the system model 12 or, alternatively, by the netlist 31. The manner of creating the 3D view of the MEMS model from the system model or netlist is explored in more detail below. Those skilled in the art will recognize that the user 34 may be separated from the electronic device 2 via a network such as the Internet. Similarly, the components used by the illustrative embodiment of the present invention may appear in a distributed manner over a network rather than being consolidated in a single electronic device 2 and the MEMS model components may be stored other than in a MEMS component library.

The system modeling environment 4 also includes a circuit simulator 8. The circuit simulator 8 is used to perform simulations of the model represented in the schematic view 36. The execution of the simulation produces a simulation result 16. A simulation result visualizer 18 uses the simulation result 16 and the system model 12 to provide a 3D view of the simulation to a user 34. The simulation result visualizer 18 works in conjunction with the schematic visualizer 14 to produce a 3D visualization of the simulation result by progressively altering the 3D view 22 to reflect changes in position over time, frequency or any other physical quantity being varied during the simulation.

The schematic visualizer 14 allows the user 34 to visualize and verify the shape, orientation and position of the components 41, 43, 45 and 47 referenced by a MEMS schematic 12 in a graphical 3D view 22. Each component 41, 43, 45 and 47 designated for 3D visualization has a corresponding 3D view generator 51, 53, 55, 57. The schematic component and its 3D view generator share the same parameters such as position, orientation, length, width and height. The 3D view generators 51, 53, 55, 57 are scripts or procedures that use the parameter information (optionally together with other design information like the fabrication process description) to create a 3D image of the component.

Figure 2:
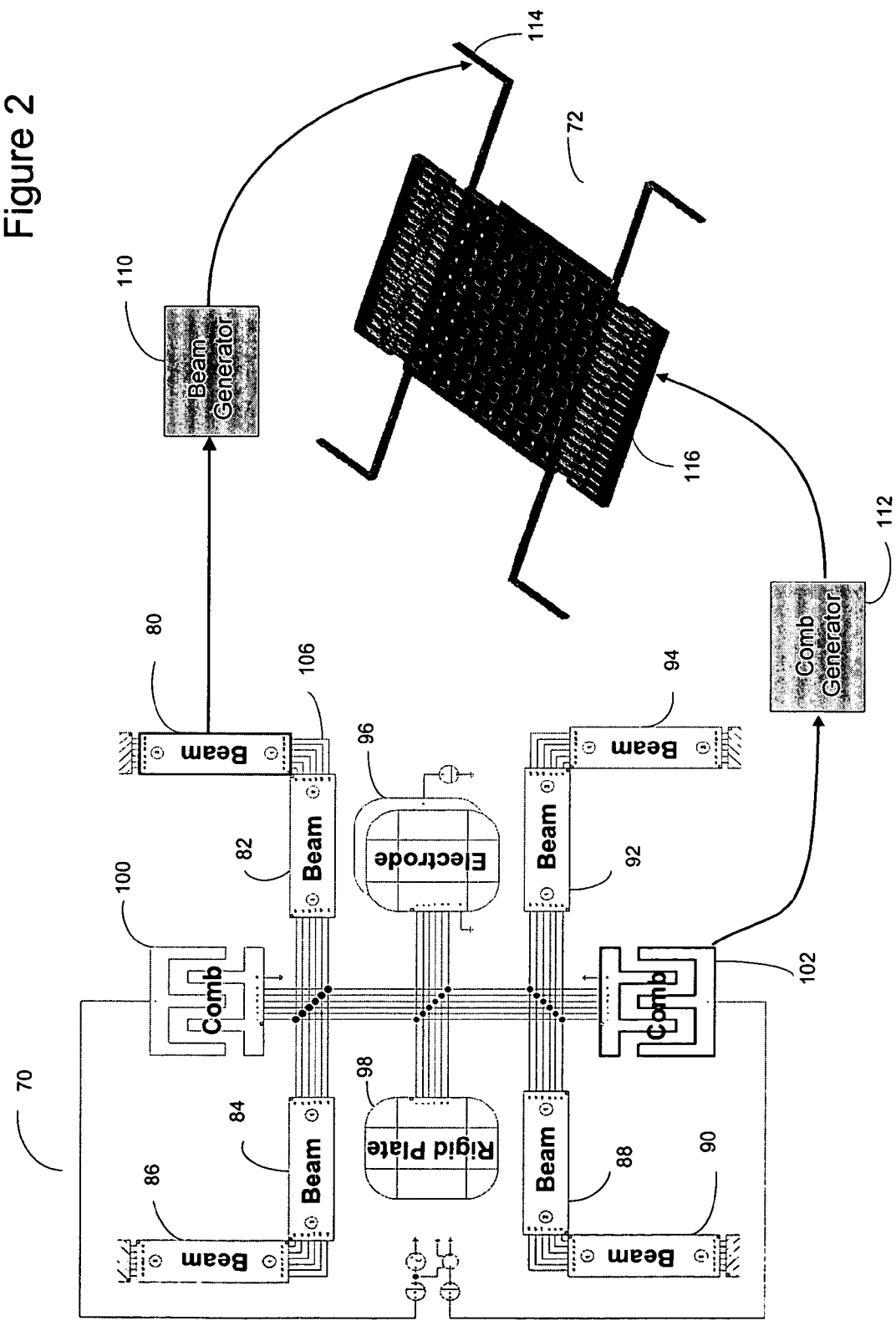
FIG. 2 depicts the interrelationship between a schematic view of a MEMS model and a 3D view of the model.

FIG. 2 depicts the relationship between a schematic view 70 and a 3D view 72 of a MEMS model produced by the illustrative embodiment of the present invention. The schematic view 70 includes multiple symbols representing the components of a MEMS model. The schematic includes beams 80, 82, 84, 86, 88, 90, 92 and 94, an electrode 96, a rigid plate 98, and comb structures 100 and 102. The symbols are connected by one or more "wires" such as the 6-wire connection 106 connecting the beams 80 and 82. The six "wires" in connection 106 represent mechanical degrees of freedom of the connected mechanical structures: three translational degrees of freedom and three rotational degrees of freedom. Those skilled in the art will realize that the significance of the wires will vary depending upon the physical domain being modeled. For instance, in an optical system, the "wire" connection may represent an optical beam. Furthermore, certain schematic editors allow multiple wires to be bundled into a single bus wire. Such a bus wire may contain all degrees of freedom needed to describe an arbitrary motion in a 3D space.

Associated with the model components referenced by the symbols in the MEMS schematic 70 are 3D view generators, such as the beam generator 110 and the comb generator 112. The beam generator 110 is used to produce a graphical 3D view of the beam 80. Similarly, the comb generator 112 is used to create the 3D view of the comb 102 in the overall 3D view 72. The overall 3D view 72 is created by utilizing a separate 3D view generator for each symbol appearing in the graphical schematic 70. Those skilled in the art will recognize that the schematic visualizer 14 may alternatively leverage a listing of model components contained in a netlist schematic 31 in order to produce a 3D view of a system model.

Figure 3:
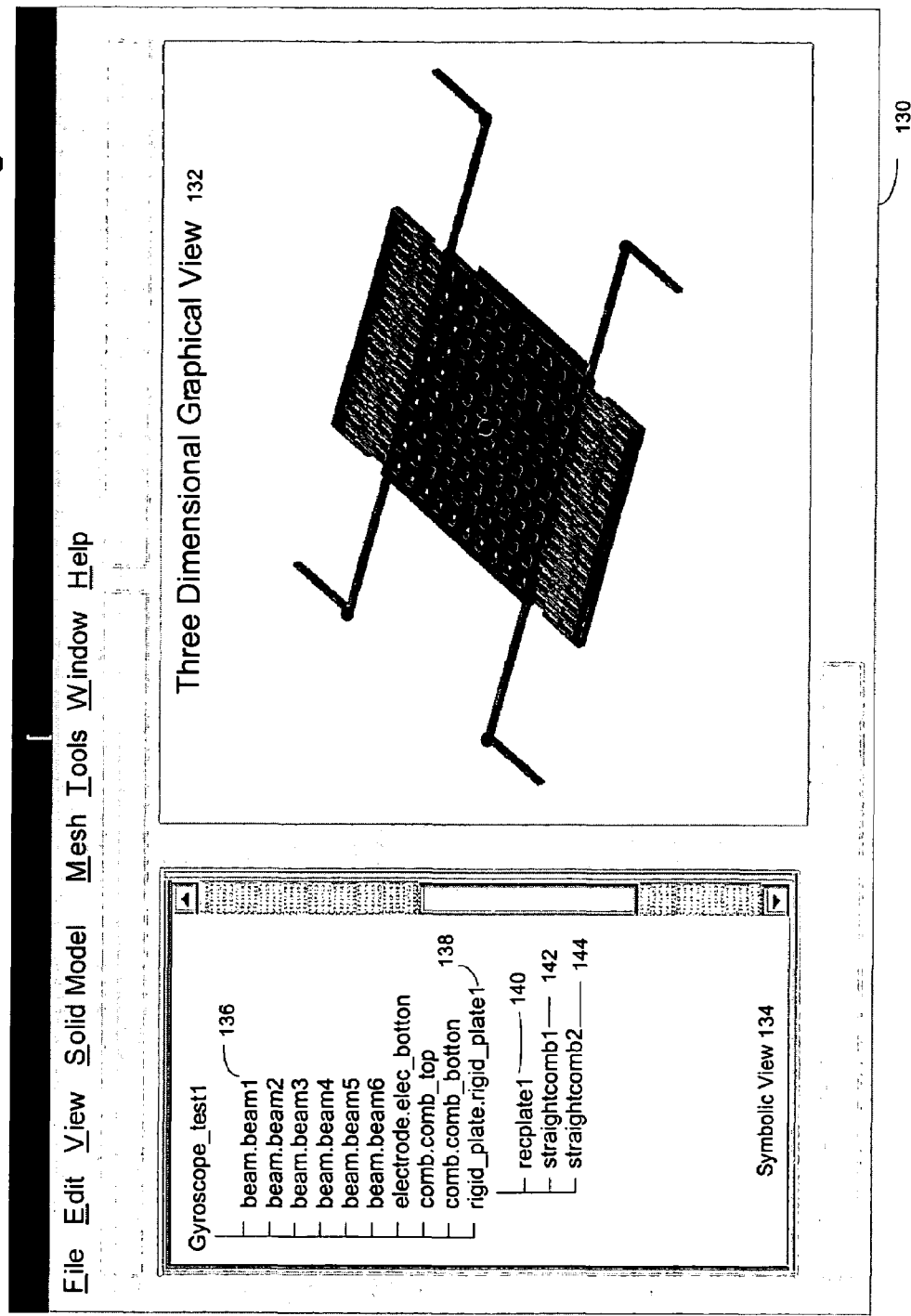
FIG. 3 depicts a user interface in the illustrative embodiment of the present invention showing a symbolic view of a system model and a corresponding 3D view.

The illustrative embodiment of the present invention includes a user interface which is presented to a user to display the 3D view. The graphical user interface may have two sub windows (as depicted in FIG. 3 below), a graphical 3D view and a symbolic view showing the component names and possible hierarchy within the schematic. The 3D view of the model is linked by two-way communication with the schematic editor 6 (schematic view). When the user 34 selects a component in any one of the views, the selection may be synchronized in the other views. For instance, if a user selects a component in the 3D view, causing the component to be highlighted, the corresponding representations of the component in the symbolic and schematic views are also highlighted. Selecting a component may be the first step for most user interactions, such as modifying the component parameters or deleting the component. Each component has an associated set of parameters that can be displayed in a "properties" sub-window. The properties sub-window may be accessed, and the parameters changed, in any of the 3 views. When the user changes parameters that affect the component position, orientation, or shape, the changes may lead to an automatic update of the 3D view. The 3D view supports state-of-the-art 3D rendering operations such as rotating, zooming, scaling the view, and suppressing the display of individual model components. Those skilled in the art will recognize that other methods of indicating a selected component in a view or views may be employed other than highlighting without departing from the scope of the present invention.

FIG. 3 depicts an implementation of the user interface 130 used to present the 3D view 132 to a user. The 3D view 132 is accompanied in this implementation by a symbolic view 134 containing a hierarchical listing of component names. The symbolic view 134 includes the component name beam.beam1 136 and subcomponents recplate1 140, straightcomb1 142, straightcomb2 144 of the hierarchical component right_plate.rigid_plate1 138. The illustrative embodiment of the present invention allows for the cross-referencing of the symbolic view 134, the 3D graphical view 132 and the schematic view 36 (the schematic view is not shown in FIG. 3) such that selection of a component or sub-component in one view causes a graphical indication to also be displayed in the corresponding views. Those skilled in the art will recognize that the different views may be cross-referenced even when not being actively shown to a user and that all three views, a single view or two views different from those shown in FIG. 3 may be presented to a user without departing from the scope of the present invention.

In order to produce a 3D view of the entire MEMS model, the schematic visualizer 14 obtains from the system model 12 (or the netlist 31) a list of model components and their parameter values. The list only includes components that are accompanied by 3D view generators. It then executes the 3D view generator associated with each component in the list.

The 3D view generators use each component's parameter values to create a corresponding 3D view 24, 26, 28, 30 and 32 in a 3D graphical window. Depending on the type of component, its 3D graphical view can be either a "realistic" shape, an abstract symbolic representation or a mixture of both. The 3D view generation can be combined with error checking of certain parameter settings (design rule checking) and symbol connectivity. Errors can be highlighted by part and/or wire selections in either the schematic view 36 or the 3D view 22, or in both.

Figure 4:
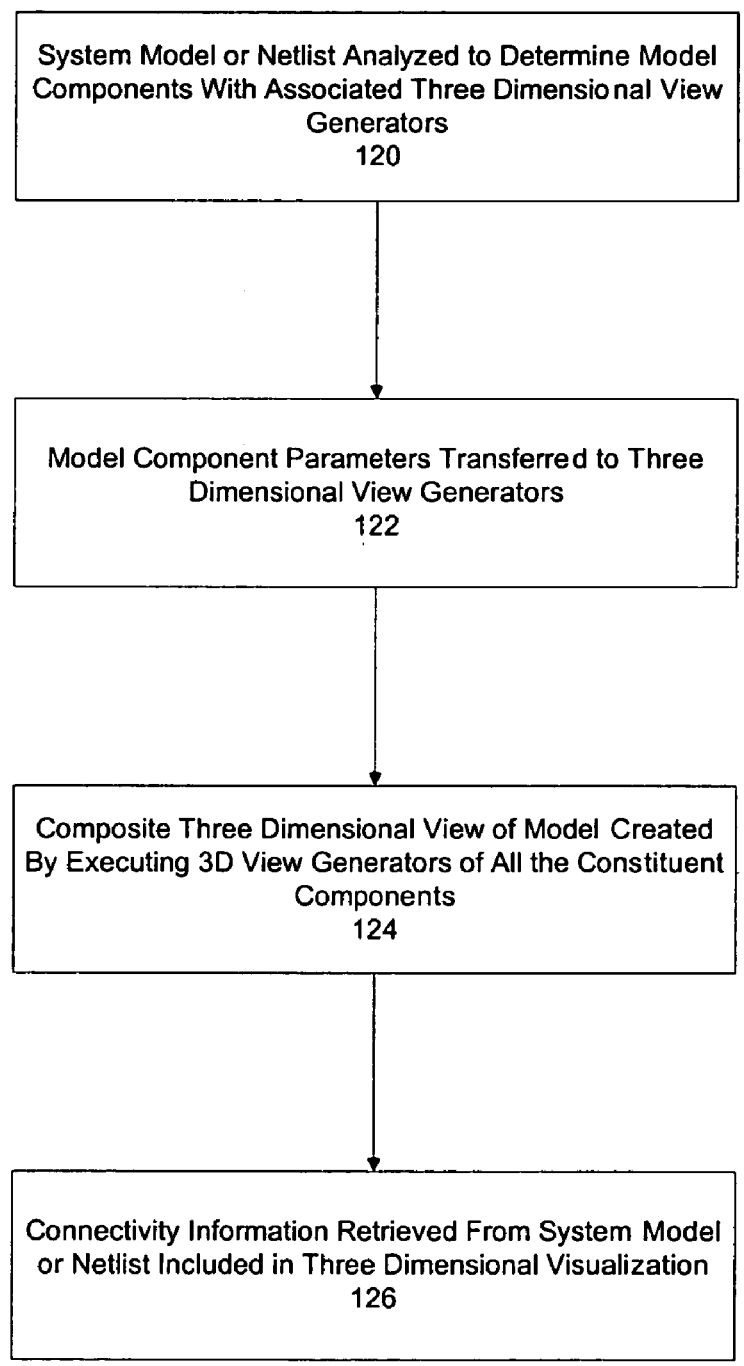
FIG. 4 is a flowchart of the sequence of steps followed by the illustrative embodiment of the present invention to generate a 3D view of the system model.

FIG. 4 is a flow chart summarizing the sequence of steps followed by the illustrative embodiment of the present invention to generate a 3D graphical view of a MEMS model. The sequence begins when the schematic visualizer 14 analyzes the system model 12 or netlist 31 to obtain a list of model components with associated 3D view generators (step 120). The parameters for each component in the list are then extracted from the system model 12 or netlist 31 and transferred to the 3D View Generators (step 122). In some situations, the 3D view generator associated with a particular component may already have the necessary parameter information, and the 3D view can be generated without additional data transfer. The composite 3D view of the associated MEMS model is then generated by executing the 3D view generators of all of the constituent components (step 124). The schematic visualizer 14 may then leverage additional connectivity information from the system model 12 or netlist 31 to render certain types of "connections", such as optical beams, in the composite 3D view (step 126).

The wires linking electrical symbols in an electrical schematic have a direct analogy in the physical world, but the meaning of wires linking the mechanical components in a MEMS schematic is more abstract. Mechanical wires come in two different types, translational and rotational wires. Schematic symbols representing mechanical parts are interconnected by up to three translational and three rotational wires (as depicted by connection 106 in FIG. 2). The values associated with the six mechanical wires define the motion and the rotation of a mechanical point in space. This point, referred to as "knot", can be seen as the physical connection point between two or more mechanical elements. There are mechanical schematic components like combs and rigid plates that are connected to only one knot. The six degrees of so freedom of a knot, plus the knowledge of its initial position, are sufficient to define the component's position and orientation in space. Other components like beams and flexible plates must be connected to more than one knot. Beams, for example, require two independent knots, one for each beam end. It is assumed that the knots are rigidly linked to the beam's end faces.

Figure 5:
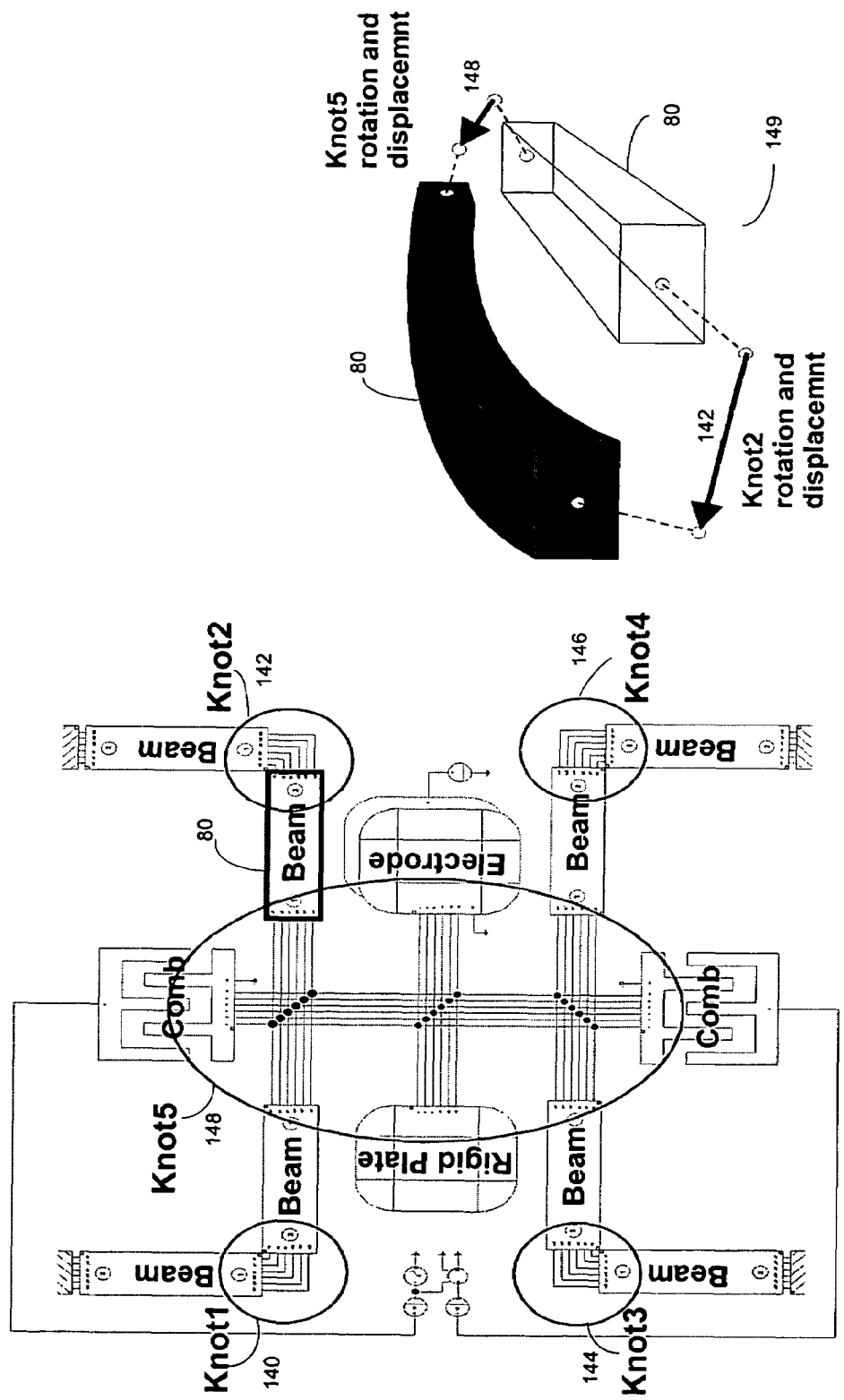
FIG. 5 depicts the correspondence between the component connection information in the schematic view and simulated movement of a model component in the system model.

FIG. 5 depicts the role knot information plays in conveying movement of mechanical structures. The graphical schematic 70 first discussed in FIG. 2 above, includes five connection points or "knots", knot1 140, knot2 142, knot3 144, knot4 146, and knot5 148. Knot2 142 and knot5 148 are adjacent to beam 80. Knot2 142 and knot5 148 undergo displacement and rotation during a simulation and the change in their parameter values affects the location and shape of the beam 80 in the generated graphical view. The changed values for knot2 142 and knot5 148 are provided at different points in the simulation results 16 to the schematic visualizer 14 to generate a visualization 149 of how the beam location and shape 80 change in response to movement.

The ability of the illustrative embodiment of the present invention to depict movements of the modeled mechanical structure allows a user to visualize simulation results in three dimensions. A simulation result visualizer 18 connected to the system modeling environment 4 is used to convey the results of a performed simulation to a user. The result visualizer may be implemented separately, or combined with, the schematic visualizer 14 already described above.

Those skilled in the art will recognize that if the simulation result visualizer 18 is implemented separately from the schematic visualizer 14, the functionality controlling the collection and processing of 3D view information that resides in the schematic visualizer needs to be included in the simulation result visualizer.

Figure 6:
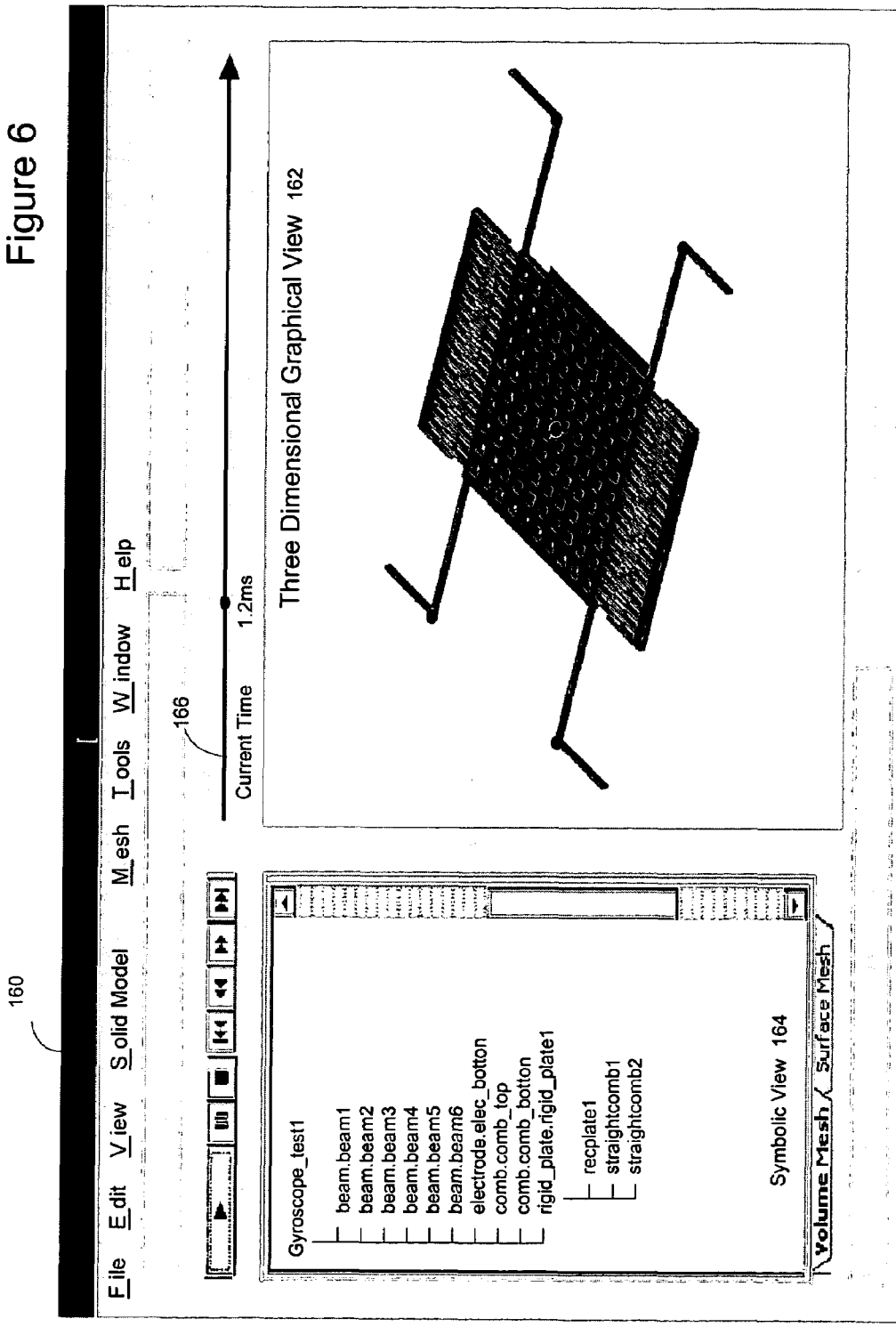
FIG. 6 is a user interface in the illustrative embodiment of the present invention showing simulation results.

The illustrative embodiment of the present invention can present simulation results to a user in three dimensions via the same 3D view as the schematic visualizer, or via a separate 3D view. FIG. 6 depicts the main window of the simulation result visualizer 160. The simulation result visualizer user interface 160 includes two views, a graphical 3D view 162 of the MEMS model and a symbolic view 164 containing component and subcomponent information listed in a hierarchical manner. Additional user controls for handling the simulation result animation 165 and a progress marker 160 showing the current point in the simulation are also displayed. The graphical 3D visualization 162 may be a static display, corresponding to a single time or frequency, or it may be animated, corresponding to a sequence of time steps, frequencies or so model parameter values. Furthermore, the 3D-view may include additional objects that are closely related to the schematic wires, such as the current positions of knots, optical beams and magnetic field points. As with the schematic visualizer, selections may be synchronized between the symbolic view, the 3D view and the schematic view. Component selections in the 3D view may highlight the component name in the symbolic view and the corresponding symbol in the schematic view, and vice versa. Object selections representing wire information such as knots, optical beams and magnetic field points may highlight the corresponding wires in the schematic view. Furthermore, the 3D view provided by the illustrative embodiment of the present invention may be manipulated with 3D rendering operations such as rotating, zooming, and scaling of the view, and hiding of individual graphical entities. Those skilled in the art will recognize that the user interface 160 may have additional features or different features without departing from the scope of the present invention.

To begin the simulation display procedure, the user 34 specifies an input system model 12 and simulator settings to the circuit simulator 6 and then runs the circuit simulator to produce a simulation result 16. The simulation result 16 includes a series of values associated with each of the connecting wires shown in the schematic view. For example, the simulated history of two independent knot motions defines a beam's position and shape in space and time. Circuit simulation involving mechanical components can be seen as the calculation of knot motions and rotations under given mechanical, electrical, thermal, magnetic or any other physical stimuli. Depending on the chosen type of analysis (e.g. steady state (DC), harmonic (AC) or transient analysis) the knot motions are calculated as a function of time, frequency and/or system model parameters, respectively.

The simulation result visualizer 18 obtains from the system model a list of components together with their parameters, and from the simulation result 16 the translations and rotations of each knot. Depending on the type of analysis, the simulation result may include just one set of values, or a list of values, for each knot. Lists of values may include the knot displacement and rotation data for each time step (transient analysis), each frequency (AC analysis) or each parameter increment (DC transfer or vary analysis). The simulation result visualizer 18 then executes the 3D generator associated with each component in the list (by processing the 3D view generator information and system model information by itself or calling the schematic visualizer 14, depending upon the implementation). The 3D view generators make use of not only the component's parameter values, but also the simulated knot position and orientation, to create a graphical 3D view of the component. The resulting graphical views of the components may show displacements and deformations if the knot position and orientation differ from their nominal values. Simulation results that contain lists of values are passed to the generators sequentially, one per time step, frequency point, etc. The continuous update of the individual 3D views by the corresponding 3D generators can be seen as an animated motion of the whole mechanical structure.

Figure 7:
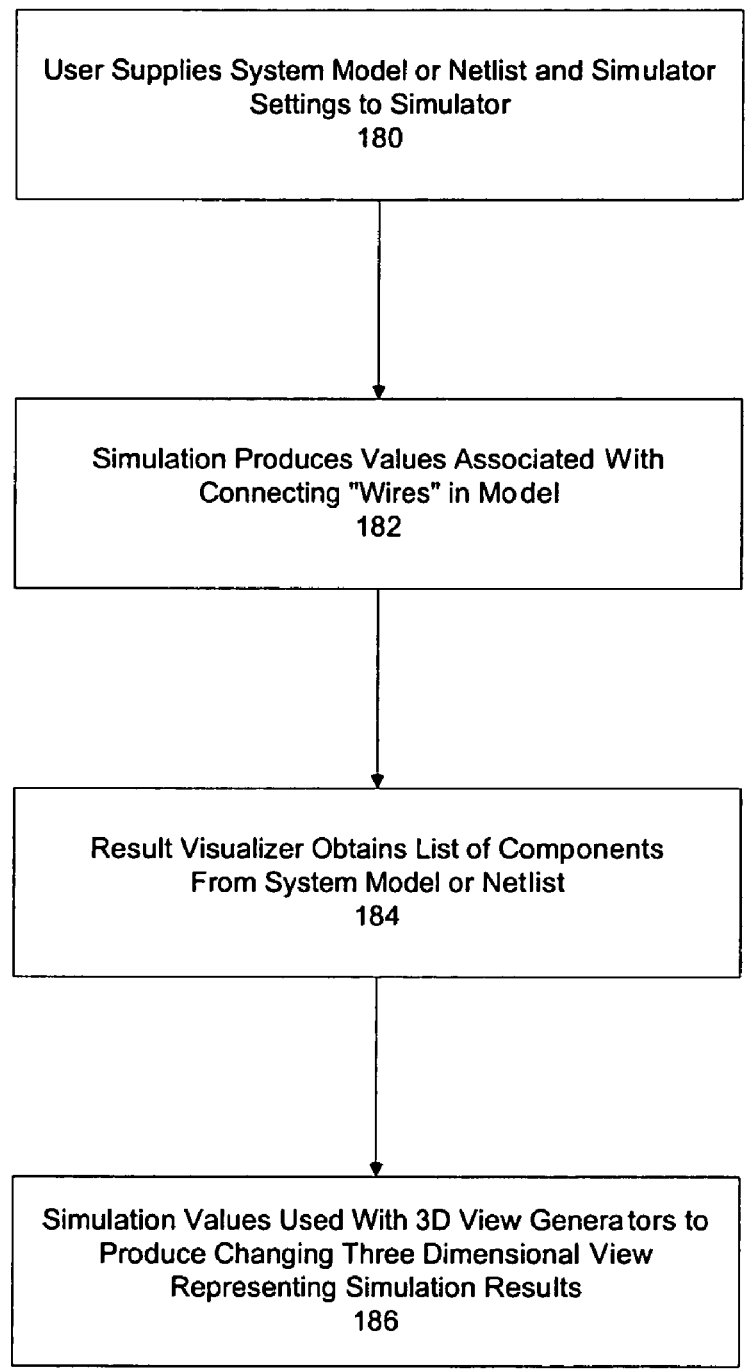
FIG. 7 is a flowchart of the sequence of steps followed by the illustrative embodiment of the present invention to display simulation results in three dimensions to a user.

FIG. 7 is a flow chart summarizing the sequence of steps followed by the illustrative embodiment of the present invention to produce a graphical 3D view of the simulation of a MEMS model. The sequence begins when the user supplies a system model or a netlist and simulator settings to the circuit simulator 8 (step 180). The simulation produces values associated with the connecting "wires" in the model (step 182). The simulation result visualizer then obtains a list of components together with their parameter values from the system model or netlist (step 184). The simulation values are then used in conjunction with the 3D view generator associated with each model component to produce changing 3D views (step 186). In other words, a different 3D view is produced for each particular point in the simulation and the combination of the images may be displayed sequentially to the user to indicate displacements of the mechanical structure over time, for a series of frequencies, or for a series of model parameter values.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Similarly, the sequence of steps utilized in the illustrative flowcharts are examples and not the exclusive sequence of steps possible within the scope of the present invention.

I claim:

1. In a Computer Aided Design (CAD) environment, a method, comprising the steps of:
    providing a model of a Micro Electro-Mechanical System (MEMS) displayed to a user in a schematic view, said MEMS model including a plurality of parameterized model components, each component having an underlying mathematical behavioral model describing mathematically how the component reacts to stimuli;
    generating a graphical three-dimensional (3D) view of said MEMS model for display to the user, the generated 3D view generated directly from the MEMS model depicted in the schematic view;
    performing a simulation by numerically executing the MEMS model, a result of the simulation being displayed in the 3D view so as to portray an animation of a mechanical motion of the MEMS; and
    cross-referencing said 3D view and said schematic view so that changes in the 3D view are reflected in the model components depicted in the schematic view and changes in the model components depicted in the schematic view are reflected in the 3D view.

2. The method of claim 1 wherein the 3D view displays one of a shape, orientation and position of said MEMS model.

3. The method of claim 1 wherein the displayed 3D view depicts a position of at least one mechanical connection point in said model, said mechanical connection point defined by at least one parameter of at least one connected mechanical part.

4. The method of claim 1, comprising the further steps of:
    selecting a model component depicted in said schematic view;
    indicating visually that a model component in said schematic view has been selected; and
    indicating visually a corresponding component in said 3D view.

5. The method of claim 4 wherein highlighting is used to indicate visually the selected model component in said schematic view and the corresponding model component in said 3D view.

6. The method of claim 1, comprising the further steps of:
    selecting a model component depicted in said 3D view;
    indicating visually that a model component depicted in the 3D view has been selected; and
    indicating visually a corresponding model component in said schematic view.

7. The method of claim 6 wherein highlighting is used to indicate visually the selected model component depicted in the 3D view and the corresponding model component in said schematic view.

8. The method of claim 1, comprising the further steps of:
    analyzing pro grammatically said MEMS model; and
    indicating visually errors in said MEMS model on at least one model component displayed in said 3D graphical view.

9. The method of claim 1, comprising the further steps of:
    altering said 3D view in response to a user command.

10. The method of claim 1, comprising the further steps of;
    providing a 3D view generator associated with at least one model component depicted in said schematic view, said 3D view generator including information used to programmatically generate a 3D view of a model component;
    analyzing programmatically said MEMS model to identify model components associated with a 3D view generator; and
    using at least one of said associated view generators to create a 3D representation of said model component an said 3D view.

11. The method of claim 1, comprising the further steps of:
    providing a symbolic view of the model depicted in said schematic that contains a list of component names, said list arranged in a hierarchical order of model components and sub-components.

12. The method of claim 11, comprising the further step of:
synchronizing said symbolic view with at least one of the display of said schematic view and the 3D view such that a selection of a model component in said symbolic view is visually indicated in the symbolic view and at least one of the display of the schematic view and the 3D view.

13. The method of claim 11, comprising the further step of:
synchronizing the symbolic view with at least one of the display of said schematic view and said 3D view such that a selection of a model component in at least one of the display of the schematic view and the 3D view is visually indicated in at least one of the display of the schematic view and the 3D view, and in the symbolic view.

14. The method of claim 1, wherein at least some data for said model components displayed in said 3D view is retrieved from a netlist.

15. The method of claim 1 wherein the plurality of model components in the MEMS model are selected from a MEMS component library.

16. A physical medium for use with an electronic device, the physical medium holding computer-executable instructions for a design and simulation environment, said instructions comprising:
instructions for providing a model of a Micro Electro-Mechanical System (MEMS) displayed to a user in a schematic view, said MEMS model including a plurality of parameterized model component, each component having an underlying mathematical behavioral model describing mathematically how the component reacts to stimuli;
instructions for generating a graphical three-dimensional (3D) view of said MEMS model for display to the user, the generated 3D view generated directly from the MEMS model depicted in the schematic view;
instructions for performing a simulation by numerically executing the MEMS model, a result of the simulation being displayed in the 3D view so as to portray an animation of a mechanical motion of the MEMS; and
instructions for cross-referencing said 3D view and said schematic view so that changes in the 3D view are reflected in the model components depicted in the schematic view and changes in the model components depicted in the schematic view are reflected in the 3D view.

17. The medium of claim 16 wherein the graphical 3D view displays one of a shape, orientation and position of said MEMS model.

18. The medium of claim 16 wherein the displayed graphical 3D view depicts a position of at least one mechanical connection point in said MEMS model, said connection point defined by at least one parameter of at least one connected mechanical part.

19. The medium of claim 16, wherein of the instructions further comprise:
instructions for selecting a model component depicted in said schematic view;
instructions for indicating visually that a model component in said schematic view has been selected; and
instructions for indicating visually a corresponding component in said 3D view.

20. The medium of claim 19 wherein highlighting is used to indicate visually the selected model component in said schematic view and the corresponding model component in said 3D view.

21. The medium of claim 16 wherein of the instructions further comprise:
instructions for selecting a model component depicted in said 3D view;
instructions for indicating visually that a model component depicted in the 3D view has been selected; and
instructions for indicating visually a corresponding model component in said schematic view.

22. The medium of claim 21 wherein highlighting is used to indicate visually the selected model component depicted in the 3D view and the corresponding model component in said schematic view.

23. The medium of claim 16 wherein the instructions further comprise:
instructions for analyzing progammatically said MEMS model; and
instructions for indicating visually errors in said MEMS model on at least one model component in said 3D view.

24. The medium of claim 16 wherein tho instructions further comprise:
instructions for altering the rendering of said 3D view in response to a user command.

25. The medium of claim 16 wherein of the instructions further comprise:
instructions for providing a 3D view generator associated with at least one model component depicted in said schematic view, said 3D view generator including information used to programmatically generate a 3D view of a model component;
instructions for analyzing programmatically said MEMS model to identify model components associated with a 3D view generator; and
instructions for using at least one of said associated view generators to create a 3D representation of said model component in said 3D view.

26. The medium of claim 16 wherein of the instructions further comprise:
instructions for providing a symbolic view of the model depicted in said schematic view that lists the component names, said symbolic view arranged in a hierarchical order of model components and sub-components.

27. The medium of claim 26 wherein the instructions further comprise:
instructions for synchronizing said symbolic view with at least one of the display of said schematic view and the 3D view such that a selection of a model component in said symbolic view is visually indicated in the symbolic view and at least one of the display of the schematic view and the 3D graphical view.

28. The medium of claim 26 wherein of the instructions further comprise:
instructions for synchronizing the symbolic view with at least one of the display of said schematic view and said 3D view such that a selection of a model component in at least one of the display of to schematic view and the 3D view is visually indicated in at least one of to display of the schematic view and the 3D view and in the symbolic view.

29. The medium of claim 16, wherein at least some data for said model components displayed in said 3D view is retrieved from a netlist.

30. The medium of claim 16 wherein said plurality of model components in said MEMS model are selected from a MEMS component library.

31. The method of claim 1, further comprising:
wherein to displayed results of said simulation are progressively altered to reflect the simulation results during different points in said simulation.

32. The method of claim 31 wherein said MEMS model includes at least one optical component.

33. The method of claim 31 wherein said MEMS model includes at least one mechanical structure.

34. The method of claim 33 wherein the simulation of said mechanical structure involves at least one of a displacement, a mode shape and a distortion of the mechanical structure.

35. The method of claim 33 wherein said MEMS model includes at least one connection between a plurality of mechanical components, said connection representing mechanical degrees of freedom of the connected mechanical components.

36. The method of claim 31 wherein at least one of the speed and viewing characteristics of the 3D view of the simulation results of said simulation is controlled by user-set parameters.

37. The method of claim 31 wherein said simulation is one of a circuit simulation and signal flow simulation.

38. The method of claim 31, comprising the further steps of:
associating a 3D view generator with a model component referenced by said MEMS model;
analyzing programmatically said MEMS model to identify model components associated with a 3D view generator; and
using said 3D view generator to generate the display of the simulation results.

39. The method of claim 31 wherein the different points in said simulation at which the simulation results are displayed represent at least one of a time increment, one of a series of frequencies, or a value in a series of model parameter values.

40. The medium of claim 16 wherein
the results of said simulation are progressively altered to reflect the simulation results during different points in said simulation.

41. The medium of claim 40 wherein said MEMS model includes at least one optical component.

42. The medium of claim 40 wherein said MEMS model includes at least one mechanical structure.

43. The medium of claim 42 wherein the simulation of said mechanical structure involves at least one of displacements, mode shapes and distortion of the mechanical structure.

44. The medium of claim 42 wherein said MEMS model includes at least one connection between a plurality of mechanical components, said connection representing mechanical degrees of freedom of the connected mechanical components.

45. The medium of claim 40 wherein at least one of the speed and a viewing characteristic of the 3D view of the results of said simulation is controlled by user-set parameters.

46. The medium of claim 40 wherein said simulation is one of a circuit simulation and a signal flow simulation.

47. The medium of claim 40 wherein the instructions further comprise:

instructions for associating a 3D view generator with a model component referenced by said MEMS model;
instructions for analyzing programmatically said MEMS model to identify model components associated with a 3D view generator; and
instructions for using said 3D view generator to generate the display of the simulation results.

48. The medium of claim 40 wherein the different points in said simulation at which the simulation results are displayed represent at least one of a time increment, one of a series of frequencies, and one of a value in a series of model parameter values.

49. In a CAD environment, a system, comprising:
a plurality of parameterized Micro Electro-Mechanical System (MEMS) model components, each said MEMS model components including a mathematical behavioral model describing mathematically how the MEMS model component reacts to stimuli, a graphical symbol for display in a schematic view, and a three-dimensional (3D) view generator, said 3D view generator being computer code holding information necessary for the 3D display of an associated MEMS model component;
a schematic editor used to create and control a schematic view of an underlying MEMS model for display to a user, said MEMS model including a plurality of MEMS model components selected from said library of MEMS components; and
a schematic visualizer, said schematic visualizer analyzing said MEMS model to identify a plurality of MEMS components associated with said 3D view generators, said 3D view generators being used by said schematic visualizer to generate a 3D view of said MEMS model, the generated 3D view generated directly from the MEMS model depicted in the schematic view.

50. The system of claim 49, comprising further:
at least two views of said MEMS model, said 3D view of said MEMS model and a symbolic view providing a hierarchical listing of components and sub-components in said MEMS model.

51. The system of claim 50 wherein at least two of said views are cross-referenced such that the selection of a component in one view causes the indication of the selection of the corresponding component in one of said other views.

52. The system of claim 49 wherein the view characteristics of said 3D view of said model are configurable by a user.

53. The system of claim 49, comprising further:
a simulator able to simulate the execution of the MEMS model depicted in said 3D view; and
a simulation result visualizer used to display results of a simulation generated by said simulator to said user by altering the display of said 3D view portray an animation of a mechanical motion of the MEMS.

54. The system of claim 53 wherein said simulator is one of a circuit simulator and signal flow simulator.

55. The system of claim 53 wherein the display of said simulation results to a user is configurable by a user to adjust at least one display characteristic of the simulation results.

* * * * *